United States Patent [19]

Katagiri

[11] Patent Number: 5,218,429
[45] Date of Patent: Jun. 8, 1993

[54] HIGH-DEFINITION TELEVISION SIGNAL CONVERTER

[75] Inventor: Takato Katagiri, Fukaya, Japan

[73] Assignee: Kabushiki Kaisha Toshiba, Kawasaki, Japan

[21] Appl. No.: 569,970

[22] Filed: Aug. 20, 1990

[30] Foreign Application Priority Data

Sep. 27, 1989 [JP] Japan .................. 1-249073

[51] Int. Cl.⁵ .................. H04N 7/01; H04N 11/20
[52] U.S. Cl. .................. 358/11; 358/140
[58] Field of Search .................. 358/11, 140, 180, 137, 358/31, 17, 21 R

[56] References Cited

U.S. PATENT DOCUMENTS

| | | | |
|---|---|---|---|
| 4,831,441 | 5/1989 | Ando | 358/11 |
| 4,870,661 | 9/1989 | Yamada | 358/11 |
| 4,985,757 | 1/1991 | Yasuki | 358/31 |
| 5,001,562 | 3/1991 | Tabata | 358/140 |

OTHER PUBLICATIONS

Transmission of HDTV by MUSE System, by Yuichi Ninomiya, et al., Japan Broadcasting Corp. (NHK) pp. 1 to 10.

Primary Examiner—Tommy P. Chin
Attorney, Agent, or Firm—Cushman, Darby & Cushman

[57] ABSTRACT

A high-definition signal is band-compressed and is supplied to a simple MUSE processor. The simple MUSE processor generates a simple high-definition television signal. A scanning line processor converts said simple high-definition television signal into an interlaced scanning signal with less scanning lines than the television signal of the present system. The television signal output from the scanning line processor is converted into an analog signal. Two color difference signals, are input to a quadrature modulator which uses a sub-carrier that follows a clock synchronized with the sampling pulse of the high-definition television signal, and is obtained from a synch regenerator. The clock is then input to a phase-locked loop circuit which generates the color sub-carrier, which is phase-synchronized with the clock, and supplies the color sub-carrier to the quadrature modulator. Therefore, the field frequency of the input television signal can be set to invert every frame so long as the field frequency of the input television signal is maintained. The frequency of the color sub-carrier can be draw-in range of a color processor of NTSC system.

6 Claims, 3 Drawing Sheets

HIGH-DEFINITION TELEVISION SIGNAL CONVERTER

BACKGROUND OF THE INVENTION

1. Field of the Invention

This invention relates to a television system converter which converts a high-definition television signal into an NTSC signal of the present television system.

2. Description of the Related Art

A high-definition television system, which differs from the present television system in terms of ratio, number of scanning lines, and frame frequency has been developed. For example, there is a MUSA (Multiple Sub-Nyquist Sampling-Encoding) system. The MUSE system is disclosed in INTERNATIONAL BROADCASTING SYMPOSIUM ON RADIO AND TELEVISION ENGINEERING 1985 SESSION 2-(7) "Transmission of HDTV by MUSE system" by Yuichi Ninomiya et al.

The transmission of MUSE signals by broadcast satellite should now be in the stage of actual transmission for practical use. To receive MUSE signals and see them as an image, a MUSE decoder and a MUSE display are required. However, MUSE decoder and display technology is not commonly available. Therefore, there is a need for a device which can receive MUSE signals and convert them for use by an NTSC system, and subsequently display the converted signal on a NTSC system.

In converting a MUSE signal into an NTSC signal, it should be notice that the field frequency of the MUSE signal is 60 Hz and that of the NTSC signal is 59.94 Hz.

Another point to notice is that a frequency of the horizontal scanning line of the MUSE signal is $30 \times 525 = 15.75$ KHz and that of the NTSC signal is $59.94 \div 2 \times 525 = 15.734$ KHz. Also, a frequency of color sub-carrier fsc is defined to a ½ multiple of the integral of one period of the horizontal scanning line, that is, 455/2.

If the television signal having field frequency of 60.00 Hz is used similar to NTSC system, color sub-carrier fsc' is $60.00/59.94 \times$ fsc. The color sub-carrier fsc' has differences of about 1000 ppm as compared with the sub-carrier fsc of the NTSC signal.

In general, the frequency draw-in range of the color sub-carrier in a television receiver is about fsc $\pm 400$ Hz (=100 mmp). If there are about 1000 ppm differences, such a frequency cannot draw in the color sub-carrier. Therefore, if the color sub-carrier having such a difference is input into a color signal processor, a color killer circuit is operated, so that an image becomes monochrome.

To overcome this problem, if a normal color sub-carrier fsc is used, the relationship of an interleave between a luminance signal such as a reference NTSC signal and the color sub-carrier cannot be completely maintained. As a result, interruptions such as a cross color and a cross luminance are frequently generated in a receiver.

SUMMARY OF THE INVENTION

An object of the present invention is to provide a television system converter which can prevent an image from becoming monochrome in a receiver, and which can reduce interruptions, such as cross color and cross luminance interference.

To attain the above object, the present invention comprises:

scanning line processing means, to which a first television signal whose frame frequency is different from that of a standard system television signal is supplied, for converting the first television signal into an interlaced scanning luminance signal and two interlaced scanning color-difference signals with a number of scanning lines which are less than television signal present standard system;

digital/analog converting means for converting the interlaced scanning signals output from the scanning line processing means into analog signals, respectively;

first synch regenerating means, to which the first television signal is supplied from an input terminal, for generating a sampling clock signal of the first television signal;

phase-locked loop means for generating a color sub-carrier and subsequently phase-sychronizing the color sub-carrier with the clock input from the first synch regenerating means; and quadrature modulating means, to which the two color-different analog signals obtained from digital/analog converting means are input, for modulating the two color-different analog signals by the color sub-carrier from the phase-locked means.

The color sub-carrier is converted into the frequency draw-in range of a next stage television system in connection with the phase-locked means, the first synch regenerating means, and the quadrature modulating means.

DETAILED DESCRIPTION OF THE PREFERRED EMBODIMENTS

An embodiment of the present invention will be explained with reference the drawings.

Figure 1:
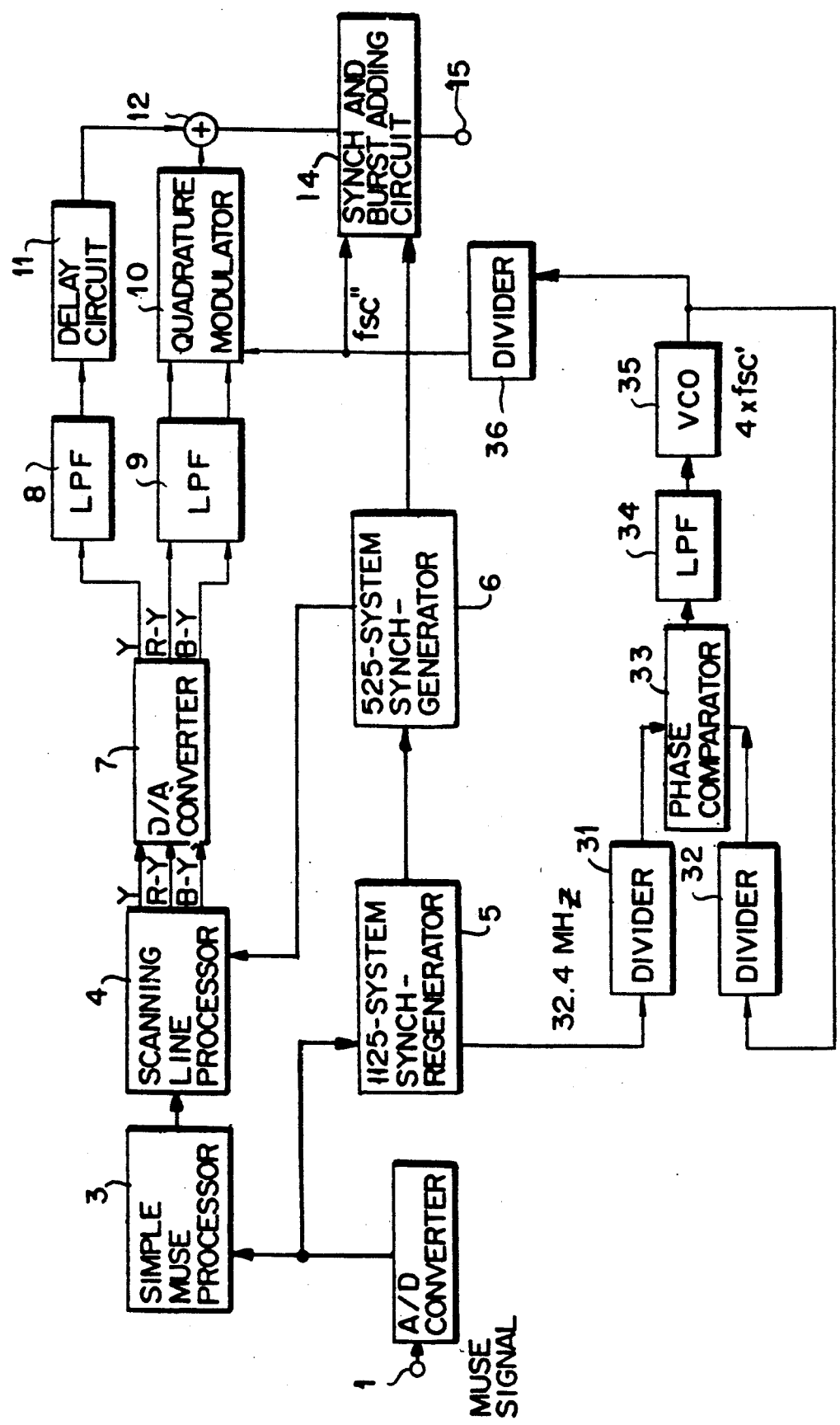
FIG. 1 is a block diagram showing one embodiment of the present invention.

FIG. 1 shows one embodiment of the present invention. A MUSE signal, which is received by a tuner, is input to an input terminal 1 and supplied to an analog to digital (hereinafter called A/D) converter 2. A digital MUSE signal, which is converted by the A/D converter 2, is supplied to the simple MUSE processor 3 and 1125 system synch regenerator 5.

In the simple MUSE processor 3, a false original high-definition signal is decoded. A clock, a timing signal, and a control signal, which are necessary to perform the MUSE processing, are generated by 1125 system synch regenerator 5. The clock, the timing signal, and the control signal are supplied to the simple MUSE processor 3, a 525 system synch generator 6, and a frequency divider 31.

Figure 2:
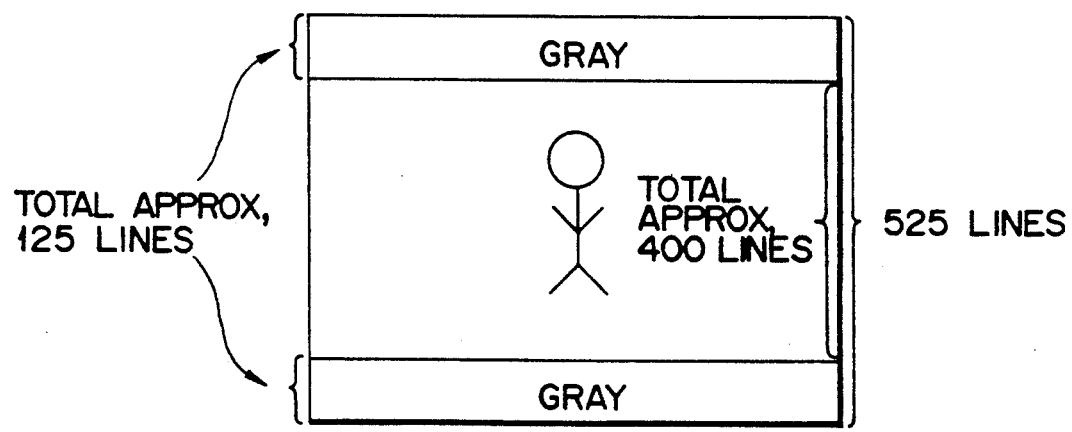
FIG. 2 is an explanatory drawing showing an example of the display of the system-converted MUSE signal.

The high-definition television signal, which is decoded by the simple MUSE processor 3, is input to a scanning line processor 4, and the number of scanning lines is changed from 1125 to 400. The reason why the number of scanning lines is not changed from 1125 to 525 is that the aspect ratio of the high-definition television signal is 16:9, so that a state of display as shown in FIG. 2 is required in order to project the image in the present television receiver. However, since the synch system of the output signal of the scanning line processor must be 525/frame, the approximately 12.5 total scanning lines in both the upper and lower portions of the display are displayed as black or gray as shown in FIG. 2. In other words, if the aspect ratio of the MUSE signal is maintained, space regions are generated in the upper and lower portions of the display.

The 525 system synch generator 6 generates the clock, the timing signal, and the like, which are necessary in the scanning line processor 4, by use of the timing signal supplied from the 1125 synch regenerator 5. However, since the conversion of the frame frequency is not considered in a MUSE-NTSC converter, the frame frequency is 60.00 Hz and the frequency of the horizontal scanning line is $30 \times 525 = 15.75$ KHz.

The luminance signal Y, which is output from the scanning line processor 4, and the color-difference signals (R - Y signal and B - Y signal) are input into a digital-to-analog (hereinafter called D/A) converter 7 and converted into analog signals. The analog luminance signal Y is supplied to a low pass filter (LPF) 8 and (R - Y) signal and (B - Y) signals are supplied to a low pass filter 9.

Two color-difference analog signals, which are output from the LPF 9, are input into a quadrature modulator 10 and modulated by a color sub-carrier fsc'', which is supplied from a divider 36. On the other hand, the analog luminance signal Y, which is output from the LPF 8, is time-adjusted by a delay circuit 11 and input into an adder 12. In the adder 12, the time-adjusted luminance signal and a carrier-color-difference signal (chrominance signal), which is supplied from the quadrature modulator 10, are synthesized.

In the quadrature modulator 10, two sub-carriers, whose phases differ from each other, are generated by use of the color sub-carrier fsc''. The two sub-carriers are modulated by the corresponding color-difference analog signals, respectively. The two modulated signals are synthesized, output as the above-mentioned carrier-color-difference signals, and input into the adder 12.

The output signals of the adder 12 are supplied to a synch and burst adding circuit 14. The synch and burst adding circuit 14 adds various control signals such as a synch signal, and a burst signal into the signals, which are supplied from the adder 12 and generates a decoded video signal, and supplies the signals to an output terminal 15.

The above-mentioned sub-carrier fsc'' is generated by a phase-locked loop circuit, which comprises dividers 31, 32, a phase comparator 33, a low pass filter 34, a voltage controlling oscillator (VCO) 35 using crystal, and a divider 36 in the following manner.

The signal, which is output from the 1125 system synch-regenerator 5, is a clock of 32.4 MHz (=960 S/H×1125×30 Hz), which is necessary for performing the simple MUSE processing. The signal is also supplied to the divider 31 and divided (1/12000). On the other hand, the output of the VCO 35, which oscillates quadruple color-sub carrier frequencies, is divided (1/5303). The outputs of the dividers 31 and 32 have their respective phase compared with each other by the phase comparator 33 and the high frequency component is removed from the different phase outputs through the LPF 34, and the outputs are supplied to the control terminal of the VCO 35.

Thereby, the oscillation frequency of the VCO 35 is phase-synchronized with the clock of the high-definition signal system.

As a result, the oscillation frequency 4fsc' of the VCO 35 is as follows:

$$4fsc' = (32.4 \ MHz/12000) \times 5303 = 14.318 \ MHz.$$

Therefore, the frequency fsc'' of the color sub-carrier, which is output from the divider 36 for ¼ dividing is as follows:

$$fsc'' = 3.579525 \ MHz \ (\text{false color sub-carrier}).$$

Then, $fsc''/30.00 = 119317.5$.

Looking fsc'' carefully, this frequency value is a ½ multiple of the integral of the frame frequency of 30.00.

Therefore, it turns out that the color sub-carrier fsc'' is a signal which is inverted every frame of the NTSC signal.

A normal sub-carrier fsc is as follows:

$$fsc = 525 \times 59.94/2 \times 455/2 = 3.579542 \ MHz.$$

Therefore, the difference between the above-mentioned fsc'' and fsc is as follows:

$$(fsc - fsc'')/fsc \times 1000000 = 4.7 \ ppm.$$

This value fully satisfies the draw-in frequency range, fsc±400 Hz (±100 ppm), of the color sub-carrier of the television receiver of the NTSC system connected to the MUSE-NTSC converter.

In the above embodiment, the dividing ratios of two dividers 31 and 32 have been set as follows:

$$1/12000, \ 1/5303, \ fsc'' = 3.579525 \ MHz.$$

However, Table 1 shows the combinations showing the case which satisfies the following three conditions:

The color sub-carrier fsc'' satisfies the draw-in frequency range, fsc ±400 Hz, of the color sub-carrier of the television receiver of the NTSC system;

The color sub-carrier fsc'' is a ½ multiple of integral of the frame frequency (30.00 Hz); and The dividing ratios of dividers 31, of 32.4 MHz, and 32, 4fsc'', are respectively small.

TABLE 1

| fsc'' | Dividing Ratio of 32.4 MHz | Diving Ratio of 4fsc'' | Difference ppm between fsc and fsc'' |
|---|---|---|---|
| 3.579255 | 1/60000 | 1/26513 | −80.2 |
| 3.579375 | 1/4320 | 1/1909 | −46.7 |
| 3.579795 | 1/20000 | 1/8839 | 70.7 |

According to the above embodiment, the conversion of the frame frequency of the first television signal (for example, MUSE signal) is not performed. In other words, the field frequency of 60.00 Hz is maintained and the color sub-carrier is locked to the phase reversing against the frame frequency. Thereby, interference of the color frequency band, such as a cross color in the display receiver and a cross luminance, can be prevented.

According to the present invention, the frequency of the color sub-carrier can be set to the frequency reversing every frame as the field frequency of the input television signal is maintained. Also, the frequency of the color sub-carrier can be set to the frequency draw-in range in the color signal processor of NTSC system. Moreover, in the present apparatus, a memory having a large capacity is not required, an image can be prevented from becoming monochrome, and interference, such as a color cross and a cross luminance, can be reduced.

As a method for reducing interference such as the cross color and the cross luminance, the field frequency of the output signal of the scanning line processor 4 is converted from 60.00 Hz to 59.95 Hz and is corrected to a reference NTSC signal. To accomplish this method, a memory having a large capacity for converting the frame frequency is provided between the scanning line processor 4 and the D/A converter 7. Then, the output signal of the scanning line processor 4 is written in the frame memory with the clock of 60.00 Hz×n and read-out with the clock of 59.94 Hz×n. n (number of samples during 1H) is approximately 1000×525.

However, according to this method, a memory of one frame (about 1000 samples /H)×525×8 bits×2 (for a luminance signal and a color signal) is required only for the conversion.

The above converter is not a simple MUSE-NTSC converter, which simply converts an MUSE signal into an NTSC signal.

In contrast, according to the embodiment shown in FIG. 1, a memory having a large capacity is not required, and interference such as a cross color and a cross luminance can be reduced.

The reason why the word "simply" is used is as follows:

In the MUSE system, an image signal of one frame is divided into four fields, and transmitted as an MUSE signal. Therefore, it is necessary to superimpose data of four fields. However, to superimpose data of four fields, a large number of memories are required, and the cost of the apparatus is increased.

For this reason, in the simple MUSE processor 3, the calculation of the data of the surrounding picture elements in the same field can be performed.

Figure 3:
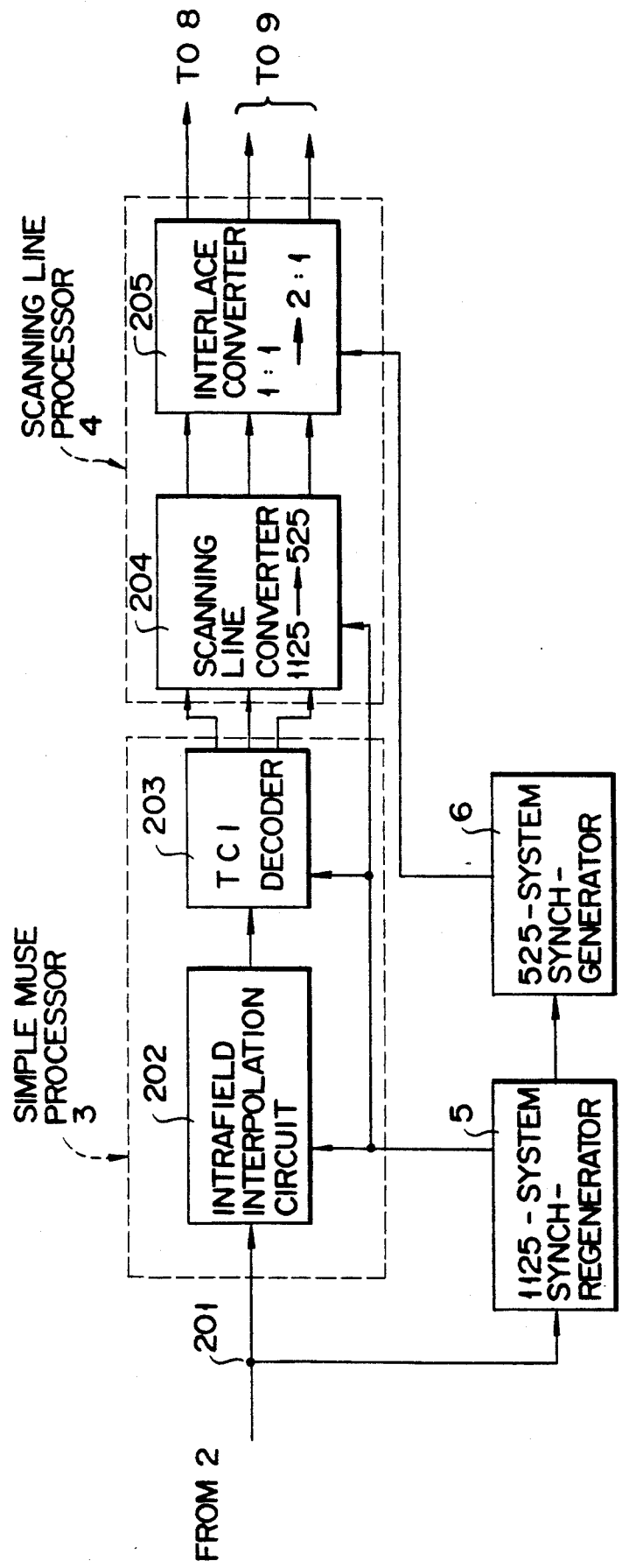
FIG. 3 is a diagram specifically showing a simple MUSE processor of FIG. 1 and a scanning line processor.

FIG. 3 shows the inner parts of the simple MUSE processor 3 and the scanning line processor 4.

An MUSE signal, which is digitized by clock rate of 16.2 MHz, is supplied to an input terminal 201. The MUSE signal is input to an intrafield interpolation circuit 202 and 1125 system synch generator 5. The intra-field interpolation circuit 202 performs interpolation processing by use of the surrounding pixels in the same fields. The interpolated signal is input to a TCI (time compressed integration) decoder 203. The TCI decoder 203 outputs two color difference signals, which are multiplied during the horizontal blanking period of the luminance signals, to be extended to the time axis. The luminance signals Y, (R - Y), (B - Y) are input to the following scanning line processor 4.

A timing signal is supplied to the scanning line processor 4 from 1125 system synch generator 5 and 525 system synch generator 6. The scanning line processor 4 comprises a scanning line converter 204 and an interlace converter 205. The scanning line converter 204 converts 1125 sequential scanning line signals into 525 sequential scanning line signals. The converted luminance signals Y, (R - Y), (B - Y) are supplied to the interlace converter 205. The interlace converter 205 converts 525 sequential scanning line signals into 525 interlaced scanning signals. The interlaced scanning signals, luminance signals Y, (R - Y), (B - Y) are input to low pass filters 8 and 9 shown in FIG. 1.

The above embodiment explains that the signals to be input to the scanning line processor 4 are simply generated MUSE signals. However, the present invention is not limited to these signals. If the signals are television signals which are different from the television signal of standard system in the frame frequency, the apparatus of the present invention can be used.

What is claimed is:

1. A television system converter, comprising:

scanning line processing means, to which a first television signal, whose frame frequency is different from a television signal of the standard system, is supplied, for converting said first television signal into an interlaced scanning luminance signal and two interlaced scanning color-difference signals with a number of scanning lines which are less than said first television signal;

digital/analog converting means for converting said interlaced scanning luminance and color-difference signals output from the scanning line processing means into analog signals, respectively;

first synch regenerating means, to which said first television signal is supplied from an input terminal, for generating a sampling clock of said first television signal;

phase-locked loop means for generating a color sub-carrier and phase-synchronizing said color sub-carrier with said sampling clock input from said first synch regenerating means; and quadrature modulating means, to which said two color-difference analog signals obtained from digital/analog converting means are input, for modulating said two color-difference analog signals by the color sub-carrier from said phase-locked loop means.

2. A television system converter according to claim 1, wherein said first television signal is a high-definition television signal whose field frequency is 60,00 Hz.

3. A television system converter according to claim 1, wherein said first television signal is a signal which can be obtained by a simple processing means, in which a high-definition signal, which is band-compressed by an offset sub-sampling circulating in 4 fields, is supplied from an input terminal, and a simple high-definition television signal is generated by superimposing fewer than 4 fields.

4. A television system converter according to claim 1, wherein said color sub-carrier is a ½ multiple of the integral of 30.00 Hz.

5. A television system converter according to claim 1, wherein said color sub-carrier is 3.579525 MHz.

6. A television system converter according to claim 1, wherein said phase-locked loop means comprises:

a first divider for dividing said sampling clock supplied from said first synch regenerating means;

a voltage controlled oscillator (VCO);

a second divider for dividing an output of VCO;

a phase comparator for phase-comparing the output of said first divider with that of said second divider;

a low pass filter for supplying a signal indicative of the phase difference obtained from said phase comparator to a control terminal of said VCO;

a third divider for dividing the oscillation output of said VCO into the frequency of the color sub-carrier of a first television signal; and means for supplying the output of said third divider serving as the color sub-carrier to said quadrature modulating means.

* * * * *